United States Patent
Hays (10) Patent No.: US 7,106,447 B2
(45) Date of Patent: Sep. 12, 2006

(54) MOLECULAR OPTICAL AIR DATA SYSTEMS (MOADS)

(75) Inventor: Paul B. Hays, Ann Arbor, MI (US)

(73) Assignee: Michigan Aerospace Corporation, Ann Arbor, MI (US)

( * ) Notice: Subject to any disclaimer, the term of this patent is extended or adjusted under 35 U.S.C. 154(b) by 283 days.

(21) Appl. No.: 10/366,910

(22) Filed: Feb. 14, 2003

(65) Prior Publication Data

US 2003/0219252 A1  Nov. 27, 2003

Related U.S. Application Data

(60) Provisional application No. 60/360,818, filed on Mar. 1, 2002.

(51) Int. Cl.
*G01B 9/02* (2006.01)
*G01P 3/36* (2006.01)

(52) U.S. Cl. .................. 356/450; 356/28.5; 356/519

(58) Field of Classification Search ........... 356/484, 356/450, 28.5, 480, 519

See application file for complete search history.

(56) References Cited

U.S. PATENT DOCUMENTS

| | | | |
|---|---|---|---|
| 3,389,256 A | 6/1968 | Astheimer | |
| 3,984,685 A * | 10/1976 | Fletcher et al. | 356/28.5 |
| 4,167,329 A * | 9/1979 | Jelalian et al. | 356/28.5 |
| 4,195,931 A | 4/1980 | Hara | |
| 4,270,864 A | 6/1981 | Barrett et al. | |
| 4,483,614 A * | 11/1984 | Rogers | 356/28.5 |
| 4,558,950 A | 12/1985 | Ulrich et al. | 356/486 |
| 4,585,341 A | 4/1986 | Woodfield | |
| 4,676,586 A | 6/1987 | Jones et al. | 385/33 |
| 4,724,326 A | 2/1988 | Poultney et al. | 205/458.1 |
| 4,818,101 A | 4/1989 | Soreide et al. | |
| 4,850,709 A | 7/1989 | Ban et al. | 356/352 |
| 4,893,003 A | 1/1990 | Hays | |
| 4,937,447 A | 6/1990 | Barrett et al. | |
| 4,983,033 A | 1/1991 | Suzuki | |
| 4,988,190 A | 1/1991 | Miles | |
| 5,000,566 A | 3/1991 | Kuppenheimer, Jr. et al. | |
| 5,029,999 A * | 7/1991 | Kremer et al. | 356/28.5 |
| 5,047,653 A | 9/1991 | Garcia et al. | |
| 5,055,692 A | 10/1991 | Abbiss et al. | |
| 5,088,815 A | 2/1992 | Garnier et al. | |
| 5,111,055 A | 5/1992 | Fima | 250/461.1 |
| 5,116,133 A | 5/1992 | Sweeney | 356/352 |

(Continued)

OTHER PUBLICATIONS

U.S. Appl. No. 60/400,462, filed Aug. 2, 2002, O'Brien et al.

(Continued)

*Primary Examiner*—Gregory J. Toatley, Jr.
*Assistant Examiner*—Patrick Connolly
(74) *Attorney, Agent, or Firm*—Raggio & Dinnin, P.C.

(57) ABSTRACT

A first beam of light from a laser is split by a beam splitter into a reference beam and at least one second beam of light, the latter of which is directed from an optical head into an atmosphere. Light from the at least one second beam of light scattered by molecules or aerosols in the atmosphere is collected by a corresponding at least one telescope of the optical head as at least one light signal. The at least one light signal and the reference beam are simultaneously processed by different portions of a Fabry-Pérot interferometer, and resulting fringe patterns are imaged onto a detector and processed by a data processor to determine at least one associated air data product.

43 Claims, 7 Drawing Sheets

U.S. PATENT DOCUMENTS

| | | | |
|---|---|---|---|
| 5,161,890 A | 11/1992 | Fima | |
| 5,214,484 A * | 5/1993 | de Mollerat du Jeu | 356/28.5 |
| 5,216,477 A | 6/1993 | Korb | |
| 5,257,274 A | 10/1993 | Barrett et al. | 372/20 |
| 5,267,010 A | 11/1993 | Kremer et al. | 356/5 |
| 5,272,513 A * | 12/1993 | Vahala et al. | 356/28.5 |
| 5,285,070 A | 2/1994 | Barrett et al. | |
| 5,285,256 A | 2/1994 | Nelson et al. | 356/4.01 |
| 5,325,175 A | 6/1994 | Mocker et al. | |
| 5,394,238 A * | 2/1995 | Mocker et al. | 356/483 |
| 5,504,620 A | 4/1996 | Maul | |
| 5,584,117 A | 12/1996 | Lee et al. | 29/592.1 |
| 5,610,705 A | 3/1997 | Brosnan et al. | |
| 5,621,523 A | 4/1997 | Oobayashi et al. | 356/336 |
| 5,629,521 A | 5/1997 | Lee et al. | 250/338.1 |
| 5,666,195 A | 9/1997 | Shultz et al. | 356/352 |
| 5,708,495 A | 1/1998 | Pitz et al. | |
| 5,982,478 A | 11/1999 | Ainsworth et al. | |
| 6,034,760 A * | 3/2000 | Rees | 356/28.5 |
| 6,141,086 A * | 10/2000 | Vahala et al. | 356/28.5 |
| 6,163,380 A | 12/2000 | Hays | |
| 6,215,802 B1 | 4/2001 | Lunt | 372/19 |
| 6,297,878 B1 | 10/2001 | Miller | |
| 6,320,651 B1 | 11/2001 | Manhart et al. | |
| 6,424,408 B1 | 7/2002 | Ooga | |
| 6,437,855 B1 | 8/2002 | Wilson et al. | |
| 6,522,397 B1 | 2/2003 | Barricau et al. | |
| 6,608,669 B1 | 8/2003 | Holton | |
| 6,634,600 B1 | 10/2003 | Krawczyk et al. | 244/158 R |
| 6,735,395 B1 | 5/2004 | Bai | 398/95 |
| 6,894,768 B1 * | 5/2005 | Caldwell et al. | 356/28 |
| 2003/0076568 A1 | 4/2003 | Wu et al. | 398/197 |
| 2003/0151732 A1 * | 8/2003 | Rogers et al. | 356/28.5 |
| 2004/0027570 A1 * | 2/2004 | Caldwell et al. | 356/28 |
| 2004/0239913 A1 | 12/2004 | Kobayashi et al. | 356/4.01 |
| 2005/0109940 A1 | 5/2005 | Carr | 250/338.4 |

OTHER PUBLICATIONS

P. Tchoryk, C. Watkins, S. Lindermann, P. Hays, C. Nardell, "Molecular Optical Air Data System (MOADS)," SPIE AeroSense Conference and Exposition, Apr. 16-21, 2002, Orlando Florida, SPIE 4377-28.

Abreu, V.J., P.B. Hays, and W.R. Skinner, "The High Resolution Doppler Imager," Optics & Photonics News, 2, #10, 28-30, 1991.

Skinner, W.R., P.B. Hays, H.J. Grassl, D.A. Gell, M.D. Burrage, A.R. Marshall, and D.A. Ortland, "The High Resolution Doppler Imager on the Upper Atmosphere Research Satellite," Optical Spectroscopic Techniques and Instrumentation for Atmospheric and Space Research, Jinxue Wang, Paul Hays, Editors, Proc. SPIE.

Marshall, A.R., D.A. Gell, J.-H. Yee, D.A. Ortland, M.D. Burrage, W.R. Skinner, and P.B. Hays, "Stellar alignment of the High Resolution Doppler Imager," J. Spacecraft & Rockets 32,#6, 1039-1043. 1995.

Skinner, W.R., P.B. Hays, M.D. Burrage, D.A. Gell, A.R. Marshall, and H.J. Grassl, "The High Resolution Doppler Imager: Intstrument performance in orbit since late 1991," SPIE: Optical Science, Engineering, and Instrumentation, Denver '96 Symposium, Denver, CO, Aug., 1996.

Yoe, J.G., Rama Varma Raja, M.K., Hardesty, R.M., Brewer, W.A., Moore, B., Ryan, J., Hays, P.B., Nardell, C.A., Gentry, B., Day, M., and Rancourt, K., "GroundWinds 2000 field campaign: Demonstration of new Doppler lidar technology and wind lidar data intercomparison," Lidar Remote Sensing for Industry and Environment Monitoring III, Hangzhou, China, SPIE Proceedings, 4893:327-336, 2003.

Tchoryk, P., C. Watkins, S. Lindemann, P. Hays, and Nardell, C.A., "Molecular Optical Air Data System (MOADS)," Lasar Radar Technology and Applications VI, SPIE Aerosense Conference, Orlando, FL,SPIE 4377-28, Apr. 16-20, 2001.

Imaki, Maqsaharu, Dongsong Sun, and Takao Kobayashi, "Direct-detection Doppler lidar for two-dimensional wind field measurements of the troposphere," in Lidar Remotes Sensing for Industry and Environment Monitoring III, Uoendra N. Singh, Toshikasu Itabe, Zhishen Liu, Editors, Proceedings of SPIE, vol. 4893.

Shibata, Yasukuni, Chikao Nagasawa, Makoto Abo, and Tomohiro Nagai, "Wind measurement accuracy with incoherent Doppler lidar using an iodine vapor filter," in Lidar Remotes Sensing for Industry and Environment Monitoring III, Upendra N. Singh, Toshikasu Itabe, Zhishen Liu, Editors, Proceedings of SPIE, vol. 4893.

Abreu, Vincent J., "Wind measurements from an oribital platform using a lidar system with incoherent detection: an analysis," Applied Optics, vol. 18, No. 17, Sep. 1, 1979, pp. 2992-2997.

Abreu, V. J., "Lidar from orbit," Optical Engineering, vol. 19, No. 4, Jul./Aug. 1980, pp. 489-493.

Hays, P.B., Kileen, T. L., Kennedy, B. C., "The Fabry-Pérot interferometer on Dynamics Explorer," Space Sci. Instrum. 5, 395-416, 1981.

Rees, D., T.J. Fuller-Rowell, A. Lyons, T.L. Killeen and P.B. Hays, "Stable and rugged etalon for the Dynamics Explorer Fabry-Perot interferometer 1: Design and construction," Appl. Opt., 21, 3896-3902, 1982.

Killeen, Timothy L., and P.B. Hays, "Doppler line profile analysis for a multichannel Fabry-Perot interferometer," Applied Optics, vol. 23, No. 4, Fegruary 15, 1984, pp. 612-620.

Abreu, V.J., J.E. Barnes, and P.B. Hays, Observations of winds with an incoherent lidar detector, Appl. Opt., 31, 4509-4514, 1992.

Hays, P.B., and HRDI Science Team: V.J. Abreu, M.D. Burrage, D.A. Gell, H.J. Grassl, A.R. Marshall, Y.T. Morton, D.A. Ortland, W.R. Skinner, D.L. Wu, and J.-H. Yee, "Remote sensing of mesopheric winds with the High Resolution Doppler Imager," Planet. Space Sci., 40, #12, 1599-1606, 1992.

Rye, Barry J., and R. Michael Hardesty, "Discrete Spectral Peak Estimation in Incoherent Backscatter Heterodyne Lidar. I: Spectral Accumulation and the Cramer-Rao Lower Bound," IEEE Transaction on Geoscience and Remote Sensing, vol. 31, No. 1, Jan. 1993, pp. 16-27.

Burrage, M.D., W.R. Skinner, A.R. Marshall, P.B. Hays, R.S. Lieberman, S.J. Franke, D.A. Gell, D.A. Ortland, F.J. Schmidlin, R.A. Vincent, and D.L. Wu, "Validation of winds from the High Resolution Doppler Imager on UARS," Optical Spectroscopic Techniques and Instrumentation for Atmospheric and Space Research, Jinxue Wang, Paul Hays, Editors, Proc. SPIE 2266, pp. 294-330, 1994.

Skinner W.R., and P.B. Hays, "Incoherent Doppler lidar for measurement of atmospheric winds," Optical Spectroscopic Techniques and Instrumentation for Atmospheric and Space Research, Jinxue Wang, Paul Hays, Editors, Proc. SPIE 2266, pp. 383-394, 1994.

Wang, J., J.Wu, and P.B. Hays, University of Michigan ground-based circle-to-line Fabry-Perot interferometer and its applications in mesosphere and lower thermosphere dynamics studies, in Optical Spectroscopic Techniques and Instrumentation for Atmospheric and Space Research, Jinxue Wang, Paul Hays, Editors, Proc. SPIE 2266, pp. 133-142, 1994.

Wu, J., J. Wang, and P.B. Hays, "Performance of a Circle-to-Line Optical System for a Fabry-Perot Interferometer: A Laboratory Study", Appl. Opt. 33, No. 34, 7823-7828, Dec. 1994.

Grassl, H.J., W. R. Skinner, P. B. Hays, M. D. Burrage, D. A. Gell, A. R. Marshall, D. A. Ortland, and V. J. Abreu, "Atmospheric wind measurements with the High Resolution Doppler Imager (HRDI)," J. Spacecraft & Rockets 32, No. 1, 169-176, Jan.-Feb. 1995.

Skinner, W.R., P.B. Hays, H. J. Grassl, D.A. Gell, M.D. Burrage, A.R. Marshall, and J. Kafkalidis, "The High Resolution Doppler Imager: Instrument performance in orbit since late 1991," Optical Spectroscopic Techniques and Instrumentation for Atmospheric and Space Research II, Paul B. Hays, Jinxue Wang, Editors, Proc. SPIE 2830, 202-214, 1996.

Barnes, John E. and David J. Hofman, "Lidar measurements of stratospheric aerosol over Mauna Loa Observatory," Geophysical Research Letters, vol. 24, No. 15, Aubust 1, 1997.

McGill, Matthew J., Wilbert R. Skinner, and Todd D. Irgang, "Analysis techniques for the recovery of winds and backscatter coefficients from a multiple-channel incoherent Doppler lidar," Applied Optics, vol. 36, No. 6, Feb. 20, 1997, pp. 1253-1268.

McGill, Matthew J., Wilbert R. Skinner, and Todd D. Irgang, "Validation of wind profiles measured with incoherent Doppler lidar," Applied Optics, vol. 36, No. 9, Mar. 20, 1997, pp. 1928-1939.

Souprayen, Claude, Anne Tgarnier, Algert Hertzong, Alain Hauchecorne, a nd Jacques Porteneuve, "Rayleigh-Mie Dopper wind lidar for atmospheric measurements. I. Instrument setup, validation, and first climatological results," Applied Optics, vol. 38, No. 12, Apr. 20, 1999, pp. 2410-2421.

McGill, Matthew J., William D. Hart, Jack A. McKay, and James D. Spinhirne, "Molding the performed of direct-detection Doppler lidar system including cloud and solar background variability," Applied Optics, vo. 38, No. 30, Oct. 20, 1999, pp. 6388-6397.

Miles, R.B., Lempert, W.R., Forkey, J.N., "Laser Rayleigh scattering," Meas. Sci. Technol. 12, R33-R51, 2001.

Dehring, D. T., C. A. Nardell, J. C. Pavlich, P. B. Hays, and I. G. Dors, "Performance and comparison of 532nm and 355nm GroundWinds lidars," Lidar Remote Sensing for Industry and Environment Monitoring III, Hangzhou, China, SPIE Proceedings, 4893: 337-47, Oct., 2002.

Hays, Paul B., Carl A. Nardell, Jane C. Pavlich, Michael T. Dehring, and Gerg Sypitkowski, "GroundWinds New Hampshire and the LIDARFest 2000 Campaign," Invited Paper, Lidar Remote Sensing for Industry and Environment Monitoring II, San Diego, SPIE Proceedings, 4484: 36-50, 2002.

Irgang, T.D., P.B. Hays, and W.R. Skinner, "Two-channel direct-detection Doppler lidar employing a charged-coupled device as a detector," Appl. Opt., 41, 1145-1155, 2002.

Liu, Zhi-Shen, Dong Wu, Jin-Tao Liu, Kai-Lin Zhang, Wei-Biao Chen, Xiao-Quan Song, Johnathan W. Hair, and Chiao-Yao She, "Low-altitude atmospheric wind measurement from the combined Mie and Rayleight backscattering by Doppler lidar with an iodine filter," Applied Optics, vo. 42, No. 33, Nov. 20, 2002, pp. 7079-7086.

\* cited by examiner

Prior Art

MOLECULAR OPTICAL AIR DATA SYSTEMS (MOADS)

CROSS-REFERENCE TO RELATED APPLICATIONS

This application claims the benefit of priority from U.S. Provisional Patent Application Ser. No. 60/360,818, filed Mar. 1, 2002, the entire content of which is incorporated herein by reference.

STATEMENT REGARDING FEDERALLY SPONSORED RESEARCH OR DEVELOPMENT

This invention was made with Government support under F33615-92-D-3602 awarded by the Flight Dynamics Directorate, Wright Laboratory, Air Force Materiel Command (ASC), United States Air Force, Wright-Patterson AFB OHIO 45433-6553. The Government has certain rights in this invention.

FIELD OF THE INVENTION

This invention relates generally to air data systems and, in particular, to an optical instrument that can directly measure wind speed and direction, density, and temperature to derive a complete set of air data products.

BACKGROUND OF THE INVENTION

"Air data products," as they are called, are determined in an aircraft using an in-flight air data system. An air data system incorporates instrumentation to collect air data products, and supplies this data directly to an aircraft's flight computer for flight control purposes. Common air data products include, but are not limited to, Mach number, true airspeed, calibrated airspeed, vertical speed, static density, static air temperature, sideslip, angle of attack, pressure altitude, and dynamic pressure.

Perhaps the oldest type of such instrumentation is the Pitot static tube. The Pitot tube (named after Henri Pitot in 1732) measures a fluid velocity by converting the kinetic energy of the flow into potential energy. The conversion takes place at the stagnation point, located at the Pitot tube entrance. A pressure higher than the free-stream (i.e. dynamic) pressure results from the kinematic to potential conversion. This "static" pressure is measured by comparing it to the flow's dynamic pressure with a differential manometer.

Pitot static tubes have proven quite effective over the years; however, there are a number of characteristics that make them undesirable in some situations. For example, at high angles of attack the air data measurements provided by pitot static systems are significantly degraded. Pitot tubes also contribute significantly to an aircraft's radar cross section, since they protrude from the aircraft body. The installation and calibration of pitot static tubes must be tailored to each airframe, and airframe modifications may require recalibration of the air data system.

Optical air data system technologies are alternatives to the traditional pitot static system. In general, an optical air data system utilizes LIDAR (Light Detection and Ranging) to remotely analyze the atmosphere. LIDAR uses an active sensor that includes a laser light source, a detection system and an analysis routine to process the signal return.

There are two types of optical air data systems: coherent and direct detection (incoherent). In a coherent LIDAR, the laser light is emitted into the atmosphere, where it scatters off of the aerosols in the air, and can be analyzed to solely determine the air velocity. For these purposes, an aerosol is defined as any type of particle that is suspended in the air.

In a direct detection system, the laser energy scatters off of both aerosols in the air, as well as the air molecules themselves, and can be analyzed to determine the air velocity, density, and temperature.

A coherent LIDAR system utilizes relatively long wavelength laser energy and relies upon Mie scattering, which is the scattering of light off of the aerosols suspended in the air. More particularly, Mie scattering refers to the scattering of light off of particles greater than $\frac{1}{10}^{th}$ the wavelength of light. However, since coherent detection LIDAR measures the properties of aerosols, it can only measure the wind velocity.

Because coherent LIDAR approaches rely solely on Mie scattering, they cannot make measurements in clean air where there are no aerosols present. In addition, coherent approaches typically utilize relatively long wavelength light, which is not absorbed by the atmosphere, presenting additional issues with long-range detection, and increased eye safety hazards.

SUMMARY OF THE INVENTION

A Molecular Optical Air Data System (MOADS) is a compact, direct detection optical instrument that can directly measure wind speed and direction, density, and temperature of a body of air. From these measurements, a comprehensive set of air data products can be determined.

In accordance with one aspect, MOADS can be a replacement for pitot static tubes. In contrast to pitot tubes, however, MOADS can operate at high angles of attack. In the proper configuration, MOADS can continue to measure air data products at angles of attack of 90 degrees. The MOADS instrument provides for a flush-mount design which lends itself to low observability since there are no aircraft protrusions to generate a radar cross section. MOADS is also airframe independent, and is much less costly to calibrate, recalibrate or service due to this lack of dependence.

The MOADS uses a Fabry-Pérot interferometer to detect the (incoherent) Doppler shift from laser light backscattered by air molecules and aerosols (Rayleigh and Mie scattering). In one embodiment, the laser used to provide the signal utilizes short wavelengths operating in the ultraviolet at 266 nm, which is invisible to the human eye and rapidly absorbed by the atmosphere.

Although the system can take advantage of aerosols when they are available, a significant advantage of MOADS over similar air data system technologies is the ability to make measurements in clear air (air molecules only), without the presence of aerosols.

The advantages of the MOADS instrument include the following:

Low observability

Operates at high angles of attack (in the proper configuration, MOADS can continue to measure air data products at angles of attack of 90 degrees)

Operates in clear air (aerosols are not required)

Airframe independent

Less costly to calibrate or recalibrate

Accurate for highly maneuverable aircraft as well as hoverable aircraft

Reduced Life Cycle Cost

Possible application to detection of wind shear, wake vortex, clear air turbulence, and engine unstart conditions

BRIEF DESCRIPTION OF THE DRAWINGS

FIG. 9 illustrates a flow chart of a process for determining derived air data products.

DETAILED DESCRIPTION OF THE DRAWINGS

The MOADS 10 (Molecular Optical Air Data System) direct detection system described herein can operate in clear air, using only molecular backscatter (i.e., no aerosols present).

In a direct detection system, the laser energy scatters off of both aerosols in the air, as well as the air molecules themselves, and can be analyzed to determine the air velocity, density, and temperature. A direct detection system utilizes relatively short wavelength laser energy in order to scatter the light off of both the molecules of air (Rayleigh scattering) as well as the aerosols in the air (Mie scattering). Rayleigh scattering refers to the scattering of light off of molecules of air, and particles up to $1/10^{th}$ the wavelength of the light. Since a direct detection system measures the properties of molecules, it can measure the air velocity, as well as the air density and temperature.

Figure 1:
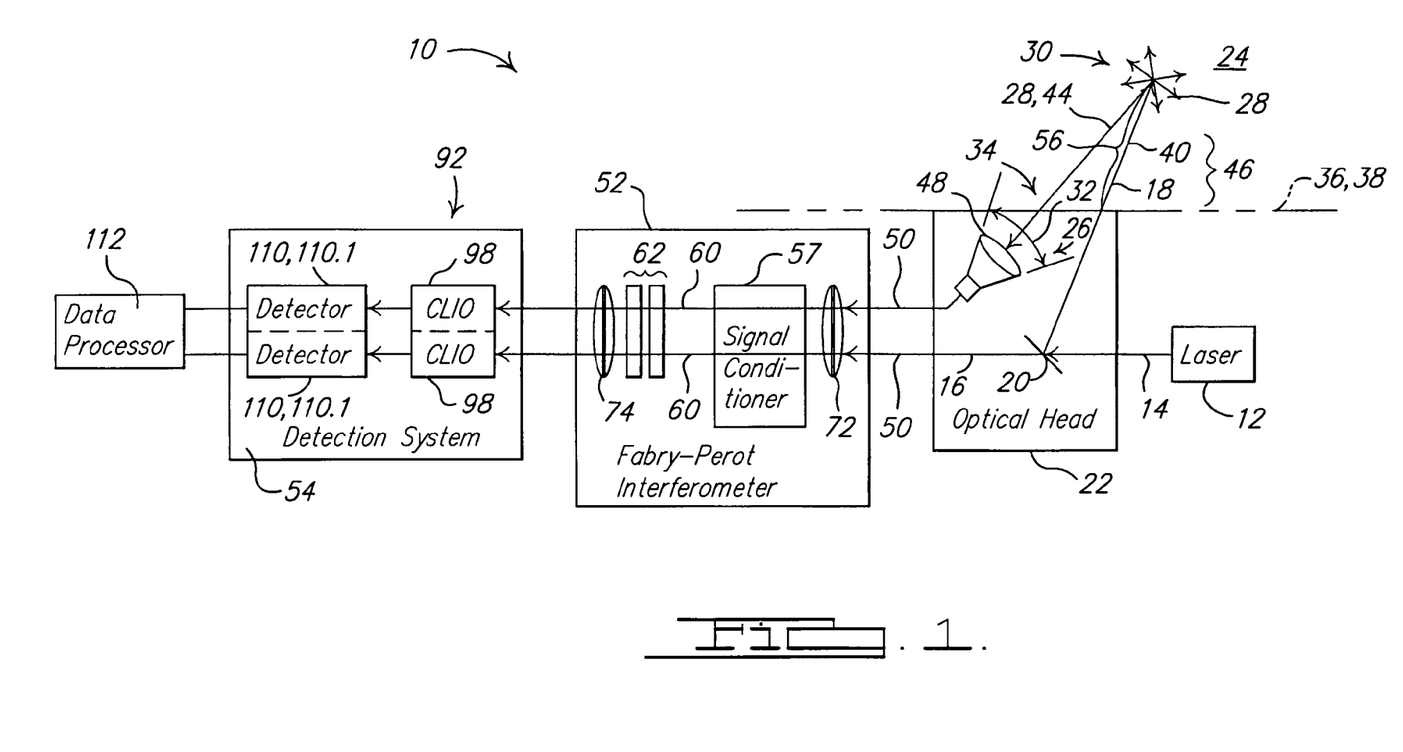
FIG. 1 illustrates a schematic block diagram of a molecular optical air data system (MOADS)

Referring to FIG. 1, a MOADS 10 comprises a laser 12 that generates a first laser beam 14 which is split into a reference beam 16 and one or more second laser beams 18 by a beam splitter optic 20 in an optical head 22, which also provides for directing the one or more second laser beams 18 into an atmosphere 24 within sight of the optical head 22. The optical head 22 further incorporates a corresponding one or more telescopes 26, each associated with one of the one or more second laser beams 18, wherein each telescope 26 provides for receiving light 28 that is backscattered by the atmosphere 24 from a corresponding interaction region 30 therein defined by the intersection of the associated second laser beam 18 with the associated field of view 32 of the corresponding telescope 26.

In one embodiment, the first 14 and second 18 laser beams comprise ultraviolet laser light at a wavelength of 266 nm that is emitted in three directions from a surface-mounted aperture 34, for example, on a surface 36 of an aircraft 38, and the associated one or more telescopes 26 provide for detecting the return from scattering of the one or more second laser beams 18 by atmospheric molecules and aerosols. The wavelength of 266 nm is beneficial for its stealth, eye safety and molecular scattering properties. There is very little natural background light due to absorption of most natural 266 nm light by ozone and molecular oxygen. However, if longer wavelength light were to be used, a simple gating system would eliminate most of the stray light. Ultraviolet (UV) light at 266 nm is readily absorbed by glass and plastic, such as used in aircraft wind screens.

Although the MOADS 10 is described herein with respect to an airframe-mounted unit, it should be appreciated that the invention can measure air data products on a variety of platforms, not limited to an aircraft 38 proper. Other possibilities include, but are not limited to, smart-guided weapons, stationary weather stations (e.g. on icy mountain tops), and wind-propelled boats. Furthermore, although one embodiment uses ultraviolet (UV) laser light, the MOADS 10 can operate over a large range of wavelengths spanning from the visible down to the ultraviolet. The UV light provides additional stealth characteristics for the system because the light is quickly absorbed by the atmosphere 24, and is not otherwise easily detected from relatively long-range distances. However, the MOADS 10 can also operate in other wavelength regions, such as longer UV wavelengths or even visible wavelengths. The associated laser 12 can be either pulsed or continuous wave (CW).

Figure 2:
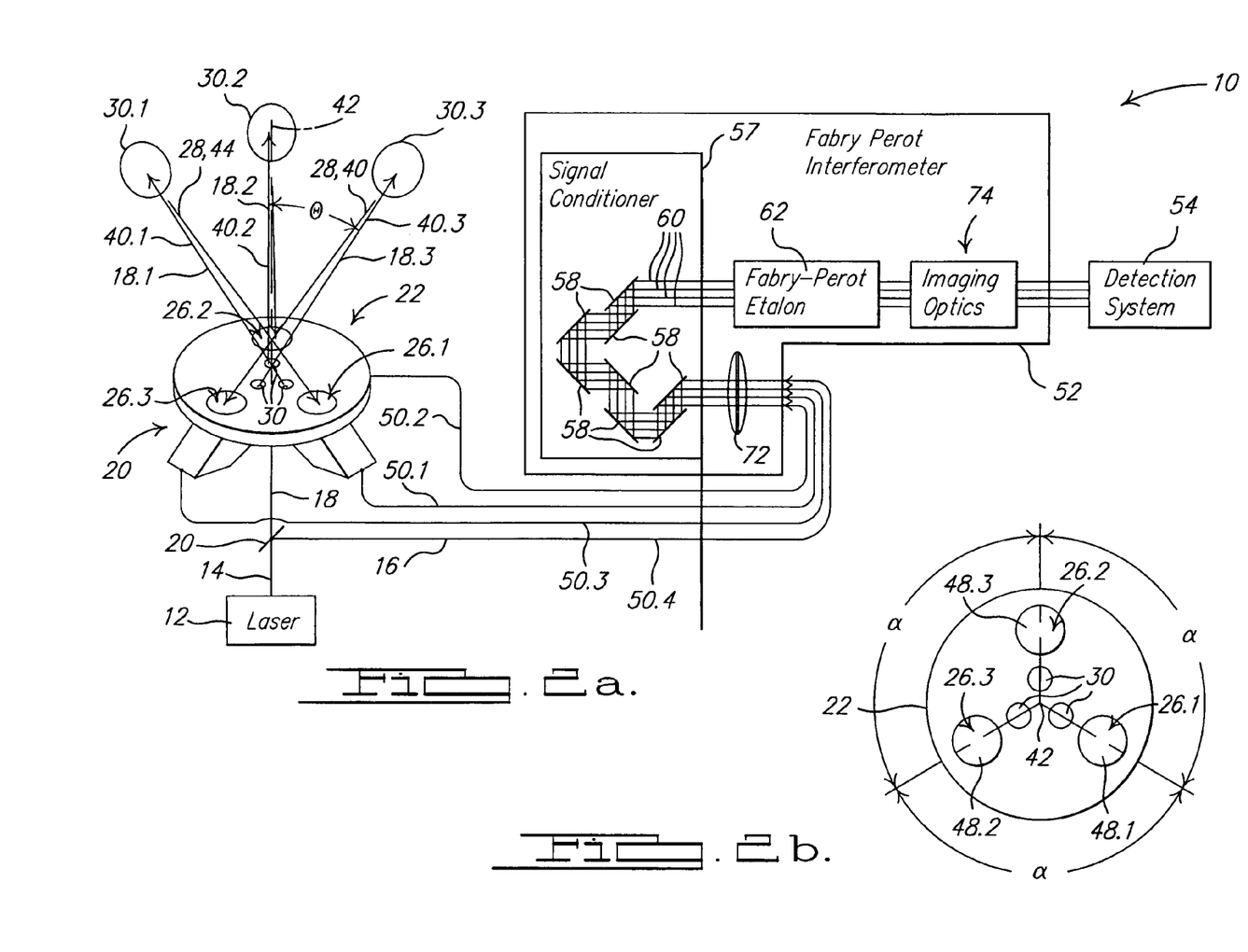
FIG. 2a illustrates opto-mechanical elements of a MOADS.
FIG. 2b illustrates a geometry of an optical head of a MOADS.

Referring to FIGS. 2a and 2b, the optical head 22 provides for directing the outgoing one or more second laser beams 18, as well as collecting the backscattered signal, i.e. light 28, utilizing the corresponding associated separate telescopes 26. The optical head 22 can be custom configured. For example, as illustrated in FIGS. 2a and 2b, at the center of the optical head 22, the first laser beam 14 is divided using a beam splitter optic 20 into three separate second laser beams 18.1, 18.2, 18.3, and then directed along three associated lines of sight 40, each spaced 120 degrees from each other and 30 degrees from the center axis 42. Light signals 44 are then collected by each telescope 26 of an array of three telescopes 26.1, 26.2, 26.3 built into the optical head 22.

It should be noted that scattering is preferably only detected in the interaction regions 30 where the field of view 32 of the detecting telescope 26 and the second laser beam 18 overlap. This creates a near-field region 46 from which there is no return, which is a desirable feature since the airstream near the aircraft 38 is turbulent. The far-field measurement is not as contaminated by the aircraft's wake. Each telescope 26 comprises a lens system 48, and the light signal 44 therefrom is collected by a fiber optic 50 that transfers the returned photons to a Fabry-Pérot interferometer 52 and an associated detection system 54.

The MOADS 10 uses the geometry of the associated second laser beam 18 and the corresponding telescope 26 as embodied in the optical head 22 to define the range 56 from the MOADS 10, rather than necessarily employing timing as is done with typical LIDAR systems. This is similar to the operation of passive sensing space flight instruments, wherein the return signal is integrated along the line of sight. Such an approach simplifies the system, although range gating could also be utilized if desired.

Each second laser beam 18 and its associated telescope 26 define a channel, and neither the number of channels, nor the geometry of the channels in relation to each other, is limiting. Although the system described herein is configured with three channels, spaced 120 degrees apart from each other, other angles may be used to calculate a wind vector.

In addition, although three channels are necessary to calculate a wind vector, the system may have extra redundant channels, or dual channels to measure wind in a particular plane, or single channels to measure the wind along a specific line of sight 40.

The light signal 44 from the lens system 48 of the telescope 26 passed through the fiber optic 50, and the reference beam 16, are processed by a signal conditioner 57 which, for example, as illustrated in FIG. 2a, incorporates eight bandpass filter mirrors 58 having associated filter pass bands centered about 266 nm which provides for filtering out associated background light. The signal conditioner 57 exhibits high out-of-band rejection, as well as low in-band attenuation, so that the resulting light signals 60 inputted to a Fabry-Pérot etalon 62 of the Fabry-Pérot interferometer 52 consists of substantially pure 266 nm wavelength light.

Figure 3A:
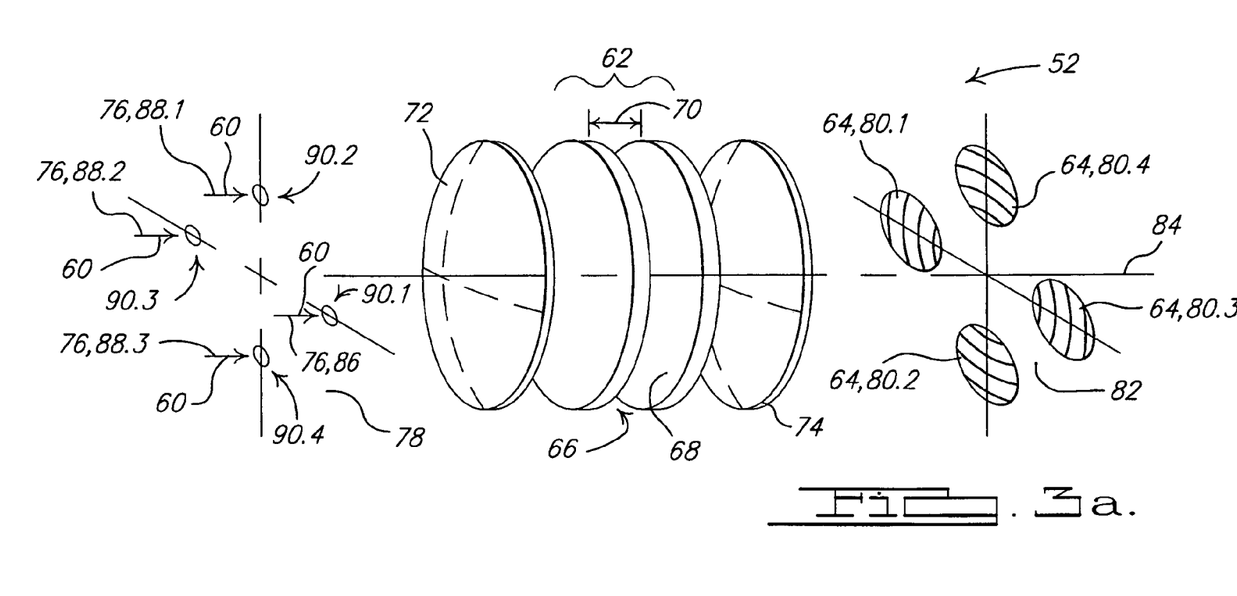
FIG. 3a illustrates an isometric view of a Fabry-Pérot interferometer.
Figure 3B:
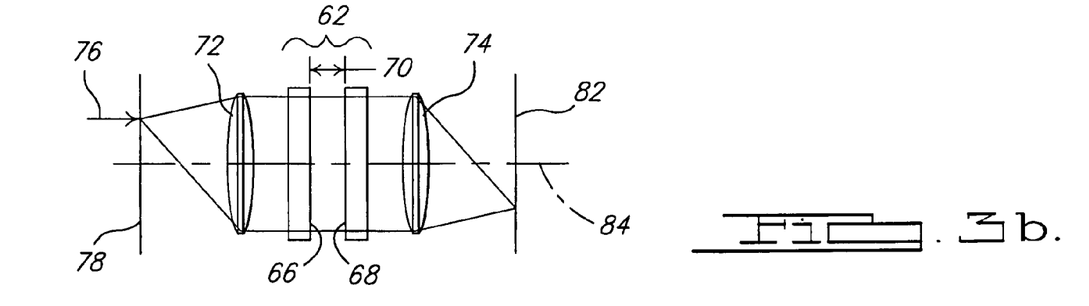
FIG. 3b illustrates a schematic diagram of the Fabry-Pérot interferometer illustrated in FIG. 3a for one associated fiber optic input and a corresponding output.
Figure 4A:
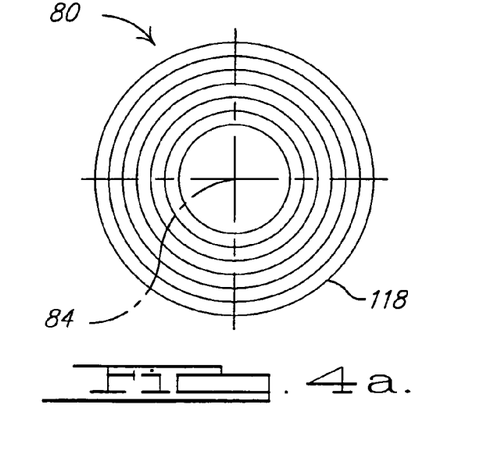
FIG. 4a illustrates fringes from a fully illuminated Fabry-Pérot etalon.

Referring to FIGS. 1, 2a, 3a, 3b, 4a and 4b the light signals 60 from the signal conditioner 57 are input to the Fabry-Pérot etalon 62 of the Fabry-Pérot interferometer 52, which provides for generating a fringe pattern 64 responsive to the optical frequency of the associated light signals 60, which optical frequency can exhibit a Doppler shift responsive to a relative velocity of the atmosphere 24 within the interaction region 30 from which the associated light 28 is backscattered. The Fabry-Pérot etalon 62 of the Fabry-Pérot interferometer 52 comprises first 66 and second 68 partially reflective surfaces which are parallel to one another and separated by a fixed gap 70, and is located between a collimating lens 72 and associated imaging optics 74. Light 76 at a focal plane 78 of the collimating lens 72 is substantially collimated thereby, and the angles at which the light 76 is passed through the Fabry-Pérot etalon 62 is dependent upon the optical frequency of the light 76, which, referring to FIG. 4a, becomes imaged as a circular fringe pattern 80—also known as Haidinger fringes—in the focal plane 82 of the imaging optics 74. Referring to FIG. 4a, for a fully illuminated Fabry-Pérot etalon 62, the resulting circular fringe pattern 80 is in the form of closed concentric circles centered about the optic axis 84 of the imaging optics 74.

Figure 4B:
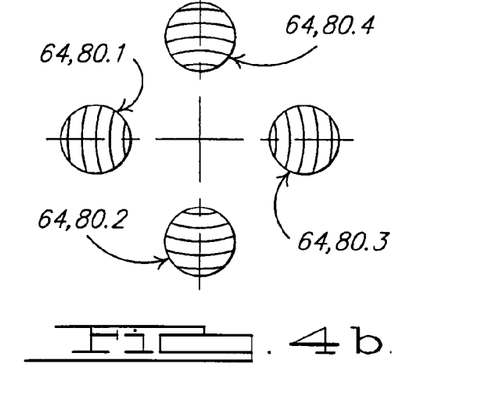
FIG. 4b illustrates fringes from a Fabry-Pérot etalon illuminated with four fiber input channels.

Referring to FIGS. 3a and 3b, one aspect that distinguishes a MOADS 10 from other direct detection optical air data systems is the efficient use of the Fabry-Pérot etalon 62 by simultaneously processing a plurality of different channels of light 76 with a single, common Fabry-Pérot etalon 62. In one embodiment, a single Fabry-Pérot etalon 62 is used with four channels of light 76, i.e. a reference channel 86 from the reference beam 16, and three signal channels 88.1, 88.2 and 88.3 from the associated three lens systems 48.1, 48.2 and 48.3 associated with each of three telescopes 26.1, 26.2 and 26.3 having respective three different lines of sight 40.1, 40.2 and 40.3. Respective fiber optics 50.1, 50.2, 50.3 and 50.4 receive light from the reference beam 16 and from each of the lens systems 48.1, 48.2 and 48.3 and illuminate corresponding portions of the Fabry-Pérot etalon 62 from respective off-axis locations 90.1, 90.2, 90.3 and 90.4 in the focal plane 78 of the collimating lens 72, producing associated images of partial circular fringe patterns 80.1, 80.2, 80.3 and 80.4, for example, as illustrated in FIGS. 3a and 4b.

The MOADS 10 provides for comparing each of the three signal channels 88.1, 88.2 and 88.3 with the reference channel 86, so as to provide for an inherent self-calibration of the associated measurements. If wavelength drift of the first laser beam 14 is not otherwise accounted for in the data, then errors can arise when making a measurement of the Doppler shift (wavelength shift) of the signal channels 88.1, 88.2 and 88.3n. The MOADS 10 provides for automatically calibrating out laser wavelength drift from the data because each measurement from a signal channel 88.1, 88.2 or 88.3 is compared to a corresponding measurement from the reference channel 86 associated with the reference beam 16.

Figure 5:
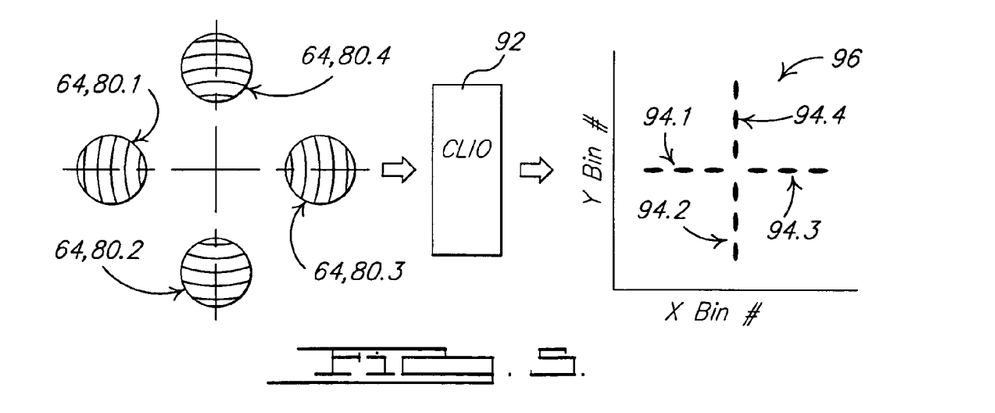
FIG. 5 illustrates four channels of fringes collapsed by circle-to-line interferometer optics CLIO to four lines in the shape of a cross pattern on an opto-electric detector.
Figure 6:
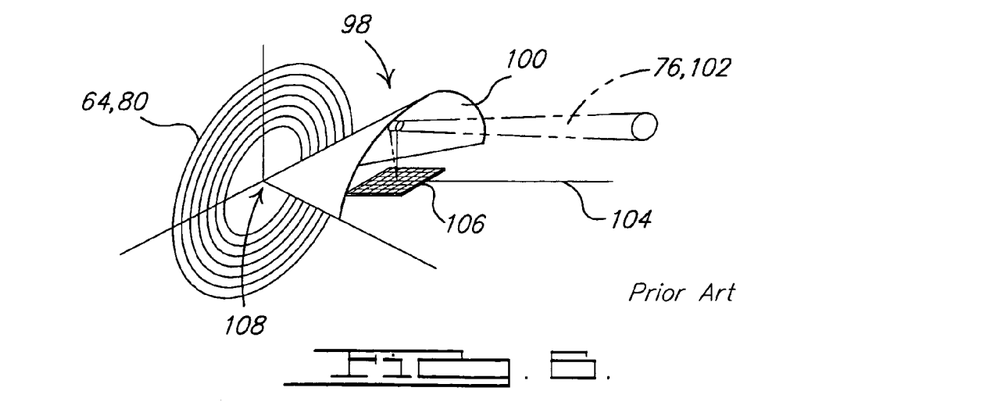
FIG. 6 illustrates a prior art circle-to-line interferometer optic (CLIO)

Referring to FIG. 5, in one embodiment, a quad circle-to-line interferometer optic 92 (quad-CLIO 92) is used to collapse the four channels 86, 88.1, 88.2 and 88.3 of circular fringe patterns 80.1, 80.2, 80.3 and 80.4 down to four associated linear patterns 94.1, 94.2, 94.3 and 94.4, forming a cross pattern 96. Although use of the quad-CLIO 92 is not essential, it can provide additional signal throughput by enhancing the associated signal to noise ratio. The resultant cross pattern 96 is substantially easier to detect using standard linear-based detectors, such as linear arrays or CCDs. Referring to FIG. 6, the CLIO 98, described in U.S. Pat. No. 4,893,033, the entire content of which is incorporated herein by reference, incorporates an internally reflecting concave conical reflector 100 for converting circular fringe pattern 80 information into corresponding linear information so as to provide for using conventional linear array detectors, such as charge coupled devices which are used in spectroscopic analysis, to detect the resulting reflected light.

The quad-CLIO 92 having a predetermined arrangement of mirrors—a tele-kaleidoscope—provides for compressing the azimuthal angular extent of the partial circular fringe patterns 80.1, 80.2, 80.3 and 80.4. Electromagnetic energy 102 from the interferometer is propagated substantially along the conical axis 104 of the cone of which the concave conical reflector 100 forms a segment, and is reflected and focused substantially onto a line in the vicinity of the conical axis 104, where the linear detector 106 is situated. In a preferred embodiment, the apex 108 of the cone is situated where the conical axis 104 intersects the focal plane 82 of the circular fringe pattern 80.

The circular fringe patterns 80.1, 80.2, 80.3 and 80.4 generated by the Fabry-Pérot interferometer 52 are transformed into a linear cross pattern 96 and then imaged onto a charge-coupled device (CCD) detector 110.1. The quad-CLIO 92 substantially improves the efficiency of the signal detection process. The CCD detector 110.1 is low-light sensitive, and provides a low noise image readout.

The signal of any signal channel 88.1, 88.2 or 88.3 received from any one of the three interaction regions 30.1, 30.2, 30.3 is processed through the Fabry-Pérot interferometer 52 and associated steering optics that focus the image onto one or more detectors 110, and is compared with the associated signal of the reference channel 86. Accordingly, the Fabry-Pérot interferometer 52 acts as a comparator to determine the wind speed, temperature, and air density. Techniques for determining these quantities have been developed for the satellite instruments that have been flown since the early 1980s. Basic system calibration is maintained by performing simultaneous observations of the reference beam 16 when observing each of the three interaction regions 30.

The MOADS 10 can take advantage of aerosols when present, but does not rely upon the presence of aerosols. The signals from the reference channel 86 and the signal channels 88.1, 88.2 and 88.3 of the MOADS 10 can be used to directly measure velocity, true airspeed, vertical speed, angle of attack, angle of sideslip, static density and static temperature. From these data products the following quantities can be directly calculated: calibrated airspeed, Mach number, static pressure, total pressure, dynamic pressure, pressure altitude, air density ratio, total temperature, angle of attack, pressure differential, and angle of sideslip pressure differential.

MOADS Data Analysis

Figure 7:
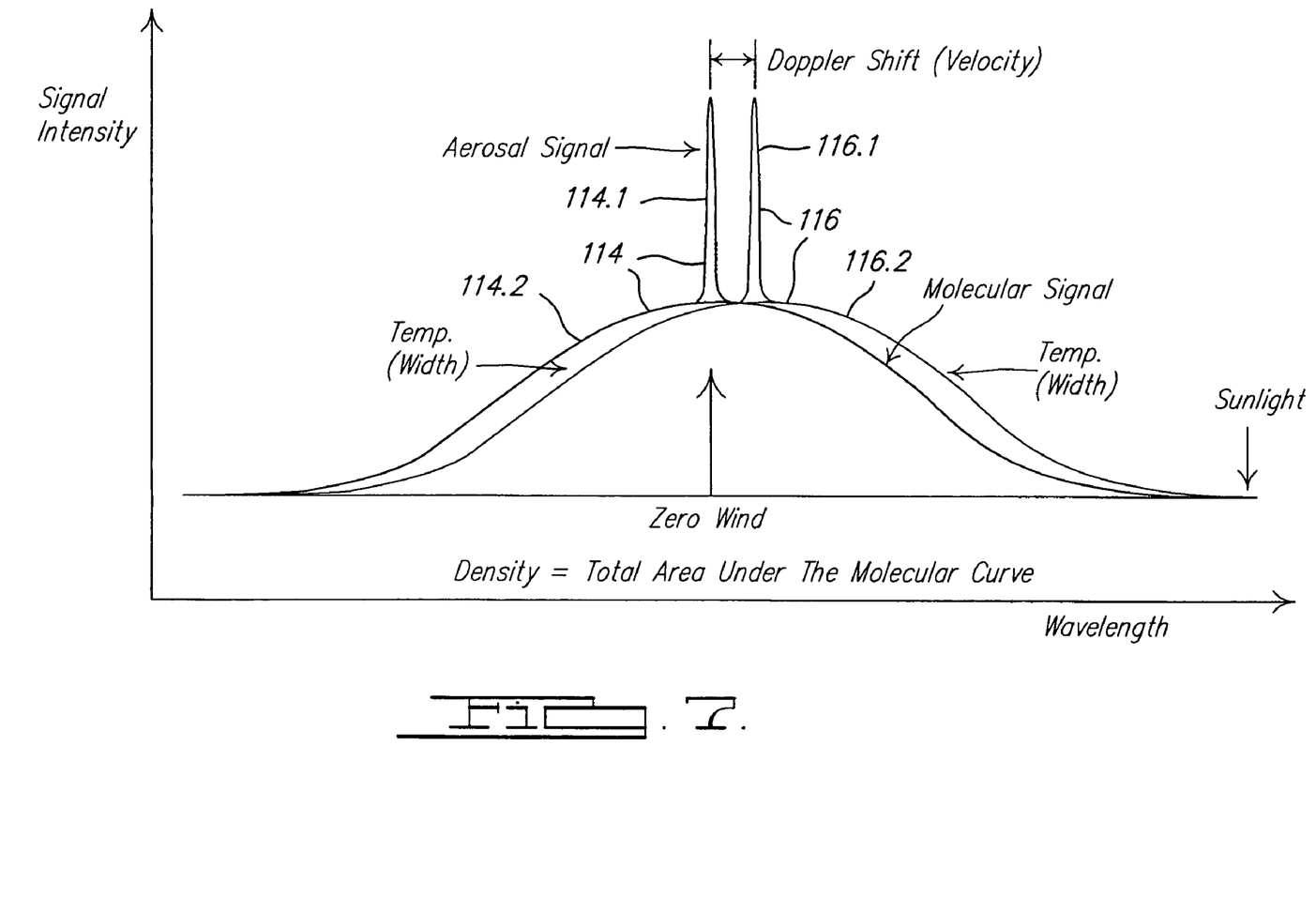
FIG. 7 illustrates an intensity of two different fringes from the Fabry-Pérot interferometer, wherein each fringe is associated with a different velocity.

Wind velocity, density, and temperature are directly calculated with a data processor 112 using the fringe data from the Fabry-Pérot interferometer 52. The other air data products are derived from these three basic measurements, in view of the knowledge of the associated geometry of the optical head 22. Referring to FIG. 7, a first fringe 114 corresponds to a zero wind, i.e. zero velocity, condition, e.g. associated with the reference channel 86, and a second fringe 116 corresponds to a non-zero wind condition, wherein both the first 114 and second 116 fringes exhibit both an aerosol signal component 114.1, 116.1 and a molecular signal component 114.2, 116.2 respectively Velocity Measurement Referring to FIGS. 7 and 8, in accordance with a first measurement process 802, the relative wind velocity $V_1$, $V_2$ or $V_3$ is determined along a corresponding line of sight 40.1, 40.2 or 40.3 from a difference between a centroid of an associated fringe of an associated signal channel 88.1, 88.2 or 88.3 in comparison with the corresponding fringe of the reference channel 86. The fringe position relative to the optic axis 84 is directly related to wavelength. Accordingly, a difference in wavelength between the circular fringe patterns 80.2, 80.3 or 80.4 associated with a signal channel 88.1, 88.2 or 88.3 and that of the circular fringe pattern 80.1 associated with the reference channel 86 is a direct measure of the molecular or aerosol Doppler shift in the light 28 that is backscattered from the atmosphere 24 responsive to either molecular or aerosol scattering.

Density Measurement

Figure 8:
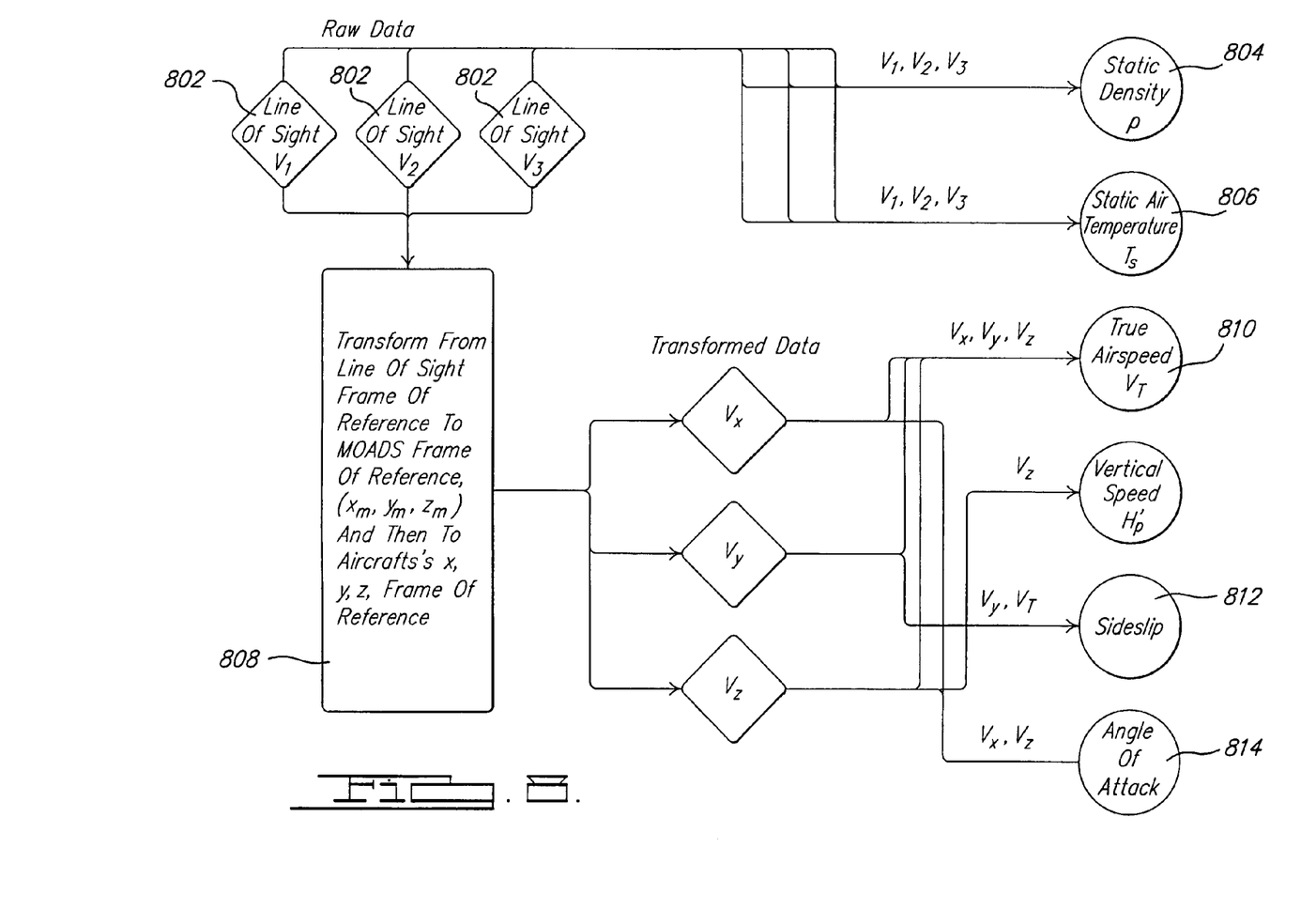
FIG. 8 illustrates a flow chart of a process for determining measured air data products.

Referring to FIGS. 7 and 8, in accordance with a second measurement process 804, the air density, i.e. static density $\rho$, is determined from an integral of the molecular signal component 114.2 of a fringe 114 associated with a signal channel 88.1, 88.2 or 88.3. Air density is related to the molecular density, not aerosol density. Accordingly, the Rayleigh backscatter is separated from the Mie backscatter in order to determine air density. The denser the air is, the more molecules are present to scatter light 28 back to the telescope 26 for detection by the associated detector 110. The density measurement is responsive to of the total number of photons received.

Temperature Measurement

Referring to FIGS. 7 and 8, in accordance with a third measurement process 806, the absolute temperature, i.e. static temperature $T_S$, of the atmosphere 24 is determined from a width of the molecular signal component 114.2 of a fringe 114 associated with a signal channel 88.1, 88.2 or 88.3. The temperature of the atmosphere 24 is related to the vibrational mode of the associated molecular content of the atmosphere 24. As the molecules exhibit a faster vibrational state, the backscatter bandwidth is widened, producing wider fringes. The absolute temperature is directly related to this signal bandwidth.

Calculation of the Air Data Products

Referring to FIG. 8, various other measured air data products may be calculated as follows: In accordance a fourth measurement process 808, the relative wind velocities $V_1$, $V_2$ and $V_3$ determined by the first measurement process 802 along corresponding lines of sight 40.1, 40.2 or 40.3 are first transformed from a line of sight frame of reference to a frame of reference ($x_m$, $y_m$ and $z_m$) of the MOADS 10, and then to a frame of reference (x, y, z) of the aircraft 38 using known transformations, so as to provide the relative wind velocities $V_X$, $V_Y$ and $V_Z$ in the frame of reference (x, y, z) of the aircraft 38, from which the true airspeed $V_T$ may be calculated from the relative wind velocities $V_X$, $V_Y$ and $V_Z$ in accordance with a fifth measurement process 810. The vertical speed $H'_P$ is given by the Z-component of relative wind velocity $V_Z$. The sideslip may be calculated from the Y-component of relative wind velocity $V_Y$ and the true airspeed $V_T$ in accordance with a sixth measurement process 812. The angle of attack may be calculated from the X and Z-components of relative wind velocity $V_X$ and $V_Z$ in accordance with a seventh measurement process 814. Referring to FIG. 9, the measured values of static density $\rho$, static temperature. $T_S$, true airspeed $V_T$, sideslip, angle of attack may then be used to compute the following derived values using associated known relations and processes: air density ratio, static pressure, total pressure, pressure altitude, total temperature, speed of sound, Mach number, dynamic pressure, calibrated airspeed, angle of sideslip pressure differential, and angle of attack pressure differential.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. An optical air data system, comprising:
    a. a laser adapted to output a first beam of light;
    b. an optical head, wherein said optical head provides for directing at least one second beam of light into an atmosphere, said at least one second beam of light is from said first beam of light, and said optical head provides for collecting light backscattered by molecules or aerosols of said atmosphere;
    c. a reference beam from said first beam of light;
    d. an interferometer, wherein a first portion of said interferometer is adapted to receive said reference beam, at least one second portion of said interferometer is adapted to receive at least one light signal from said light backscattered by said molecules or aerosols of said atmosphere, said first and second portions of said interferometer are distinct, said interferometer is operative to generate a first fringe pattern associated with said reference beam, and said interferometer is operative to generate an at least one second fringe pattern associated with said at least one light signal from said light backscattered by said molecules or aerosols of said atmosphere;
    e. at least one detector, wherein said at least one detector is adapted to detect said first fringe pattern and said at least one second fringe pattern, and said at least one detector is adapted to output a corresponding at least one signal; and
    f. a data processor adapted to determine at least one air data product responsive to said at least one signal.

2. An optical air data system as recited in claim 1, wherein said interferometer comprises a Fabry-Pérot etalon.

3. An optical air data system as recited in claim 1, wherein said at least one air data product comprises at least one of wind speed, temperature, and air density.

4. An optical air data system as recited in claim 1, further comprising:
   a. a first circle-to-line interferometer optic adapted to transform said first fringe pattern from a first at least partially circular pattern to a corresponding first substantially linear pattern; and
   b. at least one second circle-to-line interferometer optic adapted to transform a corresponding said at least one second fringe pattern from at least one second at least partially circular pattern to a corresponding at least one second substantially linear pattern.

5. An optical air data system as recited in claim 4, wherein said at least one second fringe pattern comprises a plurality of second fringe patterns, said at least one second circle-to-line interferometer optic comprises a plurality of second circle-to-line interferometer optics, and each of said plurality of second fringe patterns is processed by a different second circle-to-line interferometer optic of said plurality of second circle-to-line interferometer optics.

6. An optical air data system as recited in claim 1, further comprising at least one telescope associated with the collection of said light backscattered by said molecules or aerosols of said atmosphere associated with a corresponding said at least one second beam of light directed into said atmosphere.

7. An optical air data system as recited in claim 6, wherein said at least one light signal is coupled from said at least one telescope to said interferometer with at least one optical fiber.

8. An optical air data system as recited in claim 6, wherein said at least one second beam of light comprises a plurality of second beams of light, said at least one telescope comprises a plurality of telescopes, and each said at least one second beam of light is associated with a different said telescope.

9. An optical air data system as recited in claim 1, wherein said light backscattered by said molecules or aerosols of said atmosphere is generated within at least one region of overlap of at least one field of view of said at least one telescope with said corresponding at least one second beam of light directed into said atmosphere.

10. An optical air data system as recited in claim 9, wherein said at least one region of overlap is remote from said optical head.

11. An optical air data system as recited in claim 9, wherein the optical air data system is adapted to be installed in an aircraft, and said at least one region of overlap is adapted to be located beyond a near-field region of said aircraft, wherein said near-field region is subject to turbulence induced by said aircraft.

12. An optical air data system as recited in claim 1, wherein said first beam of light comprises ultraviolet light.

13. An optical air data system as recited in claim 12, wherein said first beam of light comprises a wavelength of about 266 nanometers.

14. An optical air data system as recited in claim 1, wherein said first beam of light comprises visible light.

15. An optical air data system as recited in claim 1, wherein said interferometer is operative to detect at least one of Rayleigh and Mie backscattering.

16. An optical air data system as recited in claim 1, wherein said data processor is operative to determine relative wind velocity responsive to said at least one second fringe pattern and said first fringe pattern.

17. An optical air data system as recited in claim 16, wherein said relative wind velocity is determined responsive to aerosol (Mie) backscatter from said atmosphere.

18. An optical air data system as recited in claim 16, wherein said relative wind velocity is determined responsive to molecular (Rayleigh) backscatter from said atmosphere.

19. An optical air data system as recited in claim 16, wherein said relative wind velocity is determined responsive to a difference between at least one first centroid and at least one second centroid, said at least one first centroid is associated with a corresponding at least one first fringe of said first fringe pattern, and said at least one second centroid is associated with a corresponding at least one second fringe of said at least one second fringe pattern.

20. An optical air data system as recited in claim 1, wherein said data processor is operative to determine air density of said atmosphere responsive to an integral of a molecular component of a fringe of said at least one second fringe pattern.

21. An optical air data system as recited in claim 20, wherein said density of said atmosphere is determined responsive to said integral of said molecular component of said fringe of said at least one second fringe pattern, said molecular component is responsive to Rayleigh backscattering, and said molecular component is separated from an aerosol component of said at least one second fringe pattern responsive to Mie backscattering.

22. An optical air data system as recited in claim 1, wherein said data processor is operative to determine an absolute temperature of said atmosphere responsive to a width of a molecular component of a fringe of said at lest one second fringe pattern.

23. An optical air data system as recited in claim 1, further comprising at least one filter adapted to filter said at least one light signal.

24. An optical air data system as recited in claim 22, wherein said absolute temperature is determined responsive to said width of said molecular component of said fringe of said at least one second fringe pattern, said molecular component is responsive to Rayleigh backscattering, and said molecular component is separated from an aerosol component of said at least one second fringe pattern responsive to Mie backscattering.

25. An optical air data system as recited in claim 24, wherein said at least one filter comprises a plurality of bandpass filter mirrors, wherein a pass frequency band of said plurality of bandpass filter mirrors is substantially centered about a frequency of said first beam of light.

26. An optical air data system as recited in claim 1, wherein said at least one second beam of light comprises at least three second beams of light projected in at least three corresponding different directions into said atmosphere, said at least one light signal comprises a corresponding plurality of light signals, each of said corresponding plurality of light signals corresponds to a different said second beam of light of said at least three second beams of light, said at least one second fringe pattern comprises a plurality of second fringe patterns, and each of said plurality of second fringe patterns corresponds to a different of said corresponding plurality of light signals.

27. An optical air data system as recited in claim 26, wherein each said second beam of light is about 120 degrees from each other and about 30 degrees from a central axis of said optical head.

28. An optical air data system as recited in claim 1, wherein an aperture of said optical head is substantially flush mounted to a surface.

29. An optical air data system as recited in claim 1, wherein said optical head is coupled to said interferometer with at least one optical fiber.

30. An optical air data system as recited in claim 1, wherein said first beam of light comprises a frequency that is substantially scattered by said atmosphere.

31. An optical air data system as recited in claim 1, wherein said at least one second beam of light comprises at least two second beams of light projected in different directions substantially along a plane so as to provide for measuring a velocity in said plane.

32. An optical air data system as recited in claim 1, wherein said interferometer is adapted to simultaneously process said reference beam and said at least one light signal from said light backscattered by said molecules or aerosols of said atmosphere.

33. An optical air data system as recited in claim 31, wherein at least one said first and second circle-to-line interferometer optics comprises an at least partially conical reflector and a detector adapted to detect light directed at said at least partially conical reflector, wherein an apex of a cone underlying said at least partially conical reflector is proximate to a focal plane of at least one of said first fringe pattern and said corresponding said at least one second fringe pattern.

34. An optical air data system as recited in claim 1, wherein said at least one detector comprises at least one CCD detector.

35. An optical air data system as recited in claim 1, wherein said data processor provides for comparing at least a portion of said at least one second fringe pattern with at least a portion of said first fringe pattern.

36. An optical air data system as recited in claim 1, wherein said at least one signal comprises at least one first signal responsive to said first fringe pattern and at least one second signal responsive to said at least one second fringe pattern, and said at least one first signal is used to calibrate said at least one second signal.

37. An optical air data system as recited in claim 1, wherein said at least one beam of second light comprises a plurality of second beams of light, said at least one light signal comprises a corresponding plurality of light signals, and said data processor is operative to determine a plurality of line of sight velocity components associated with said corresponding plurality of light signals, and to transform said plurality of line of sight velocity components so as to determine an associated vector velocity.

38. An optical air data system as recited in claim 1, wherein said optical air data system is installed in an aircraft, and said at least one beam of second light comprises a plurality of second beams of light, said at least one light signal comprises a corresponding plurality of light signals, and said data processor is operative to determine a plurality of line of sight velocity components associated with said corresponding plurality of light signals, and to transform said plurality of line of sight velocity components so as to determine an associated plurality of aircraft velocity components in a coordinate system of said aircraft.

39. An optical air data system as recited in claim 38, wherein said data processor provides for determining at least one of true air speed, vertical air speed, slide slip, and angle of attack responsive to said associated plurality of aircraft velocity components.

40. An optical air data system as recited in claim 38, wherein said data processor provides for transforming said plurality of line of sight velocity components by first transforming to a frame of reference of the optical air data system followed transforming to said coordinate system of said aircraft.

41. An optical air data system as recited in claim 1, wherein said at least one air data product comprises at least one measured air data product selected from line of sight air velocity, true airspeed, static air density, static air temperature, vertical airspeed, angle of sideslip, and angle of attack.

42. An optical air data system as recited in claim 41, wherein said at least one air data product comprises at least one derived air data product derived from said at least one measured air data product, where said at least one derived air data product is selected from static air pressure, total air temperature, speed of sound, Mach number, total pressure, air density ratio, pressure altitude, calibrated airspeed, dynamic pressure, angle of sideslip pressure differential, and angle of attack pressure differential.

43. An optical air data system, comprising:
a. a laser outputting one or more beams of light;
b. an optical head for directing the beams of light into the atmosphere, and to collect the light backscattered by molecules or aerosols present in the atmosphere;
c. an interferometer operative to generate an atmospheric fringe pattern associated with the light backscattered along multiple channels;
d. a sensor to detect the incoherent Doppler shift in said atmospheric fringe pattern and output corresponding electrical signals;
e. a data processor to determine a set of air data products based upon the electrical signals; and
f. a reference beam from the laser into the interferometer to calibrate the optical channels.

* * * * *

UNITED STATES PATENT AND TRADEMARK OFFICE
CERTIFICATE OF CORRECTION

| | | |
|---|---|---|
| PATENT NO. | : 7,106,447 B2 | Page 1 of 1 |
| APPLICATION NO. | : 10/366910 | |
| DATED | : September 12, 2006 | |
| INVENTOR(S) | : Paul B. Hays | |

It is certified that error appears in the above-identified patent and that said Letters Patent is hereby corrected as shown below:

Title Page Item (56) Pg. 2, 2nd column, 7th Cited Reference, - Please delete "Fegruary" and insert -- February -- after Vol. 23, No.4

Title Page Item (56) Pg. 2, 2nd column, Last Cited Reference, - Please delete "Aubust" and insert -- August -- after Vol. 24, No. 15

Title Page Item (56) Pg. 3, 1st column, 3rd Cited Reference, - Please delete "a nd" and insert -- and -- after Alain Hauchecorne

Col. 5, Line 67 - Please delete "n" after 88.2 and 88.3

Col. 7, Line 46 - Please delete "of" after is responsive to

Col. 10, Line 28, Claim 22 - Please delete "lest" and insert -- least -- after a fringe of said at Signed and Sealed this Twenty-eighth Day of November, 2006

JON W. DUDAS
*Director of the United States Patent and Trademark Office*